Figure 1:
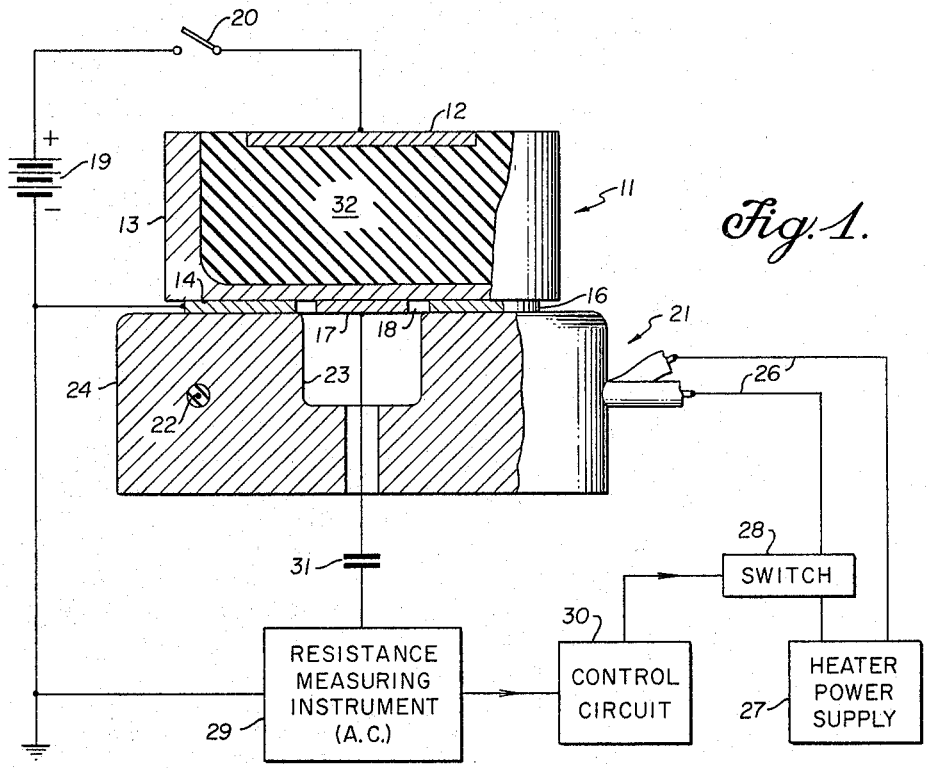

Dec. 6, 1966  F. S. GOULDING  3,290,179
METHOD AND APPARATUS FOR DETERMINING DRIFT DEPTH
OF IMPURITIES IN SEMICONDUCTORS
Filed Jan. 14, 1964

INVENTOR.
FREDERICK S. GOULDING
BY
ATTORNEY.

United States Patent Office 3,290,179
Patented Dec. 6, 1966

3,290,179
METHOD AND APPARATUS FOR DETERMINING DRIFT DEPTH OF IMPURITIES IN SEMICONDUCTORS
Frederick S. Goulding, Lafayette, Calif., assignor to the United States of America as represented by the United States Atomic Energy Commission
Filed Jan. 14, 1964, Ser. No. 337,689
5 Claims. (Cl. 148—1.5)

The invention described herein may be manufactured and used by or for the Government for governmental purposes without the payment of any royalty thereon.

This invention relates generally to semiconductor devices and more particularly to a method and apparatus for facilitating the manufacture of accurate solid state charged particle radiation detectors.

The usage of semiconductors to measure the energy of charged particles depends upon the availability of very high resistivity semiconductor material. Silicon is the material usually employed although other substances may be utilized. When such high resistivity material is used in a reversed biased P-N junction, a thick depletion layer is obtained. The depletion layer is sensitive to charged particles so that the junction is effective as a radiation detector.

Unfortunately the production of sufficiently high resistivity silicon by normal crystal growing procedures is impractical due to the small traces of acceptor impurities (particularly boron) which remain in a silicon after purification. However, it is possible to transform the impure, low resistivity, P-type silicon into very high resistivity P-type material by a lithium drifting process. Such technique, described in an article in the periodical, Physical Review, Vol. 119, No. 3, August 1960, pages 1014–1021 entitled "Diffusion of Lithium in Silicon at High Temperature and the Isotope Effect", is commonly used to produce high resistivity silicon for radiation detectors. This technique involves diffusing lithium into one face of a thick wafer of a single crystal P-type silicon to form a thin N-type region in such face. Subsequently, a reverse bias is applied to the junction and the temperature is raised to a value in the region of 120° to 150° Centigrade. Under such conditions the lithium ions drift from the N-region into the P-region of the wafer, under the action of the electric field, in such a way as to exactly compensate for the P-region acceptor impurity atoms. Thus, a layer of very high resistivity silicon grows from the N-region into the P-region silicon wafer. The rate of growth of this layer is dependent upon the applied voltage and is extremely sensitive to the wafer temperature.

While the lithium drifting process is understood theoretically, accurate control of wafer temperature is difficult to obtain in practice and calculations of the time required to drift the lithium ions from one side of the wafer to the opposite side are subject to large errors. This creates manufacturing problems in that very accurate knowledge of the proximity of the drifted layer to the opposite or rear face, that is the face opposite the lithium diffused N-region, is necessary. Drifting of the layer very close to the rear face is required since any remaining undrifted region absorbs part of the particle energy when the device is used as a radiation detector. Thus, the drifted region should approach as closely as possible the rear face of the wafer. However, if the drifted region actually penetrates the rear face, a large leakage current occurs in the device. The leakage current causes excess lithium to drift into the bulk of the material with consequent conversion to N-type material, thereby lowering the resistivity of the drifted layer and degrading the performance of the detector.

A principal purpose of the present invention is to provide for determination of the thickness of the undrifted region during the drifting process and to indicate such thickness continuously so that the drift process can be terminated when the thickness of the undrifted region is a minimum, but before leakage currents occur. In the present invention, the physical arrangement and electrical connections insofar as the wafer is concerned may be similar to that used in the normal lithium drifting process except for a change in the electrical contact means used on the rear side of the wafer. In the conventional process, such contact is made by evaporating a metal (usually aluminum, nickel or silver) across the entire rear face of the wafer. The rear face of the wafer is then placed on a heated surface which raises the wafer temperature to a value suitable for the drift operation. The back voltage source is connected to the deposited metal to provide adequate electrical contact to the rear face of the wafer.

In the present invention, the configuration of the deposited metal contact surface on the rear of the wafer differs from the prior practice in that an uncoated annular gap of controlled width is provided in the deposited metal. Thus a conductive central disc electrically isolated from an encircling ring is provided. A resistance measuring instrument is then connected from the central disc to the outer ring. The resistive path between the central disc and the outer region is through the undrifted region of the wafer and, as drifting proceeds, the undrifted region becomes thinner and the measured resistance increases.

Since a back bias potential is applied to the semiconductor during the drifting process, the resistance measurements must be made with either A.C. or pulse techniques to avoid interference from leakage current. The resistance measuring intrument may be equipped with a meter calibrated to continuously indicate the thickness of the undrifted region. The resistance measuring instrument may also be used as a component in an automatic controller which stops the drifting process when the resistance exceeds a predetermined value, such maximum resistance corresponding to a minimum safe thickness of the undrifted layer. In practice the invention can easily measure layer thicknesses as small as $2.10^{-4}$ centimeters.

Therefore, it is an object of the present invention to provide an improved method and apparatus for manufacturing semiconductor radiation detectors.

It is another object of the present invention to provide a more accurate and reliable technique for controlling the thickness of a radiation sensitive layer in a semiconductor device.

It is another object of the present invention to automatically control the duration of the drift process in the manufacture of semiconductors.

It is another object of the present invention to provide a method and means for accurately measuring the thickness of a low resistance undrifted layer in a semiconductor.

It is yet another object of the present invention to provide a method and apparatus for manufacturing radiation sensitive semiconductors in which the proportion of products that fail to meet necessary specifications is greatly reduced.

It is still another object of the present invention to reduce the manufacturing cost of radiation sensitive semiconductors by eliminating the need for accurate control of temperature during the manufacture thereof.

Figure 2:
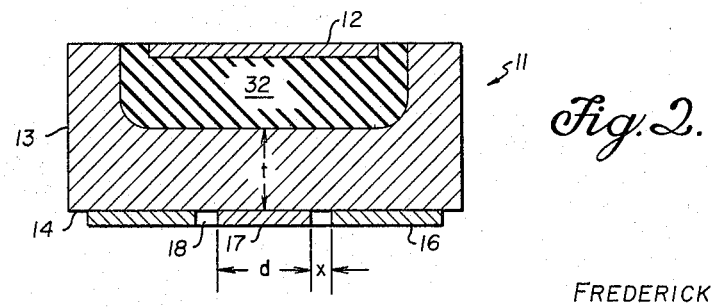

The invention will be better understood by reference to the following specification and the accompanying drawing of which:

FIGURE 1 illustrates apparatus for manufacturing semiconductor devices according to the present invention with certain elements shown in section and with associated circuitry shown schematically, and FIGURE 2 is a simplified axial section view of a semiconductor device according to the present invention with dimensional references to the various regions therein.

Referring now to FIGURE 1, there is shown in section view a semiconductor P-N junction element 11, typically a wafer-shaped block of purified single crystal P-type silicon. A thin layer 12 along the top surface of semiconductor 11 is provided with a donor impurity of lithium, creating an N-type crystal structure in the layer. The remaining region 13 of the semiconductor is P-type material which contains traces of acceptor impurity atoms that, prior to drifting, lower the resistivity of the silicon sufficiently to deleteriously effect the use of the junction as a radiation detector. However, by utilizing the lithium drifting process, the acceptor impurity atoms can be exactly compensated by a like number of lithium donor atoms from the N-layer 12, creating a very high resistivity material within region 13 as is required for proper operation.

To effect the drifting process, a temperature condition as specified by Pell (supra) is provided and a reverse bias is applied from the surface of the N-layer 12 to the opposite rear surface 14 of the semiconductor 11. Since, it is necessary in the process to provide electrical contact over a large area of the rear surface 14, a conductive coating is evaporated thereon prior to the drifting operation.

In the present invention, such conductive coating is evaporated through a suitable mask so that a ring 16 is plated onto the surface 14, the ring 16 encircling a central disc 17 and being electrically separated therefrom by a gap 18. In the conventional practice of such lithium drifting process, no gap 18 was provided and the conductive coating was continuous across the surface 14. In the present invention, the lithium drifting process is initiated by applying a back voltage through a switch 20 across the P-N junction of the semiconductor 11 from a battery 19 or similar source with the positive voltage terminal connected to the N-layer 12 and the negative voltage terminal connected to the conductive ring 16. Simultaneously, the semiconductor 11 is disposed on an annular electric heater 21 having a resistance heating element 22. A cavity 23 is provided at the center of the heater 21 to permit electrical isolation of the central disc 17. The heater 21 thus has an annular body portion 24 for evenly distributing the heat from the element 22 to the ring 16. The element 22 is energized through leads 26 from a heater power supply 27 with a suitable switch 28 connected in series with one of the heater leads 26.

A resistance measuring instrument 29, which may be of conventional design, is connected from the ring 16 to the disc 17. Since a D.C. current from the battery 19 is applied to the semiconductor 11 at the same time that resistance measurements are made, it is preferable that the resistance measurement be made by pulsed or by A.C. means to avoid interference from the direct current. Thus a capacitor 31 may be connected between the resistance measuring instrument 29 and the disc 17 to isolate such instrument from the direct currents.

The heater switch 28 is controlled by an output signal from a control circuit 30. When the resistance measured in the semiconductor by instrument 29 exceeds a predetermined maximum, the control circuit 30 causes the switch 28 to open. A suitable control circuit 30 may be of the known type which includes a photoelectric means for detecting the position of the pointer in a meter in the measuring instrument 29, the photoelectric means being activated when the pointer reaches a position corresponding to the maximum allowable impedance.

At the start of the drift process, only two identifiable regions exist in the semiconductor 11, the P-region 13 and the N-region 12. With the application of heat and a reverse bias voltage, a lithium drifted region 32 is formed in the semiconductor 11 when a small portion of the lithium atoms from the N-region 12 move into the adjacent P-region 13.

In FIGURE 1, such drifted region 32 is indicated in an intermediate stage of the drift process. The size of the region 32 during the drift process increases from nothing at the start until nearly the entire volume of the P-region 13 is converted into the high resistivity lithium drifted region 32. As indicated in FIGURE 1, the drifted region 32 is highly resistive while the P-region has a much lower resistivity.

Heretofore, no accurate technique has existed for determining when the lithium drifted region 32 has reached optimum size. However in the present invention the impedance measured by the resistance measuring instrument 29 increases rapidly when the lithium drifted region 32 approaches the surface 14 thereby providing a precise and reliable means for determining when the drifting step should be terminated. As previously mentioned, the semiconductor 11 properties will be degraded if the drift process continues after the drift region 32 reaches the surface 14.

The resistance reading (R) at which the switch 28 is opened by control circuit 30 to terminate the drift process may be determined by the following relationship:
If $t$=thickness of undrifted region in centimeters (cm.)
$d$=diameter of disc 17 in centimeters
$x$=distance across gap 18 in centimeters
$\rho$=resistivity of P-region 13 material at drift temperature in ohm-centimeters
$R$=resistance measured by instrument 29 in ohms,
and if $$t \ll x$$

and $$x \ll d$$

then:

$$R = \frac{\rho x}{\pi d t}$$

For example, if:

$\rho = 2000$
$x = 0.1$ cm.
$d = 0.7$ cm.

therefore:

$$t \cong \frac{10^2}{R}$$

If an R of 10,000 ohms is measured by the measuring instrument 29, then, $t = 0.001$ cm.

The technique can easily measure values of $t$ as small as 0.0002 cm. While automatic control of the switch 28, and thus the drifting process, is readily obtained by automatic measurement of R as herein described, it is also possible to dispense with the control circuit 30 and to attach a meter, calibrated in thickness of the undepleted layer, to the measuring instrument 29. Thus it is possible for an operator to manually terminate the drift process by manual operation of switch 28 after observation of the meter. However, for quantity production of semiconductors, automatic control is generally more convenient.

Further preparation of the semiconductor may include either etching away the ring 16, disc 17 and replacing them with a new contact means or by plating over the ring 16, disc 17 to fill in the intervening gap so that a continuous contact means is provided.

Obviously, many variations are possible in the invention, for instance more even heating of the semiconductor 11 is obtained if the cavity 23 in the heater 21 is filled by an electrically insulated section which will conduct heat from the heating element to the disc 17. While silicon semiconductor material has been particularly mentioned in the preceding description, germanium type material may be similarly utilized, although somewhat less satisfactory than silicon.

Thus while the invention has been disclosed with respect to a specific embodiment, it will be apparent to those skilled in the art that numerous variations and modifications may be made within the spirit and scope of the invention and it is not intended to limit the invention except as defined in the following claims.

What is claimed is:

1. In apparatus for determining the optimum time for terminating a lithium drifting process in the manufacture of a semiconductor of the type having a positive region and a negative region, the combination comprising a first electrode disposed on a surface of said positive region, an annular second electrode disposed on the surface of said positive region and encircling said first electrode, said first electrode and said second electrode being separated by a gap, means to apply a reverse negative voltage bias between said negative region and said second electrode, means to heat said semi-conductor whereby upon application of said bias and heat, lithium drifting is effected, a resistance measuring instrument connected from said first electrode to said second electrode, a control circuit connected to the output of said instrument and providing an output signal in response to a predetermined high resistance measurement by said instrument, means operatively coupled to said control circuit to cut off operation of said means to heat in response to said output signal from said control circuit, thereby terminating said drifting and whereby a lithium drifted region is formed within a predetermined zone between said negative region and said surface.

2. Apparatus as described in claim 1 further characterized in that said resistance measuring instrument comprises an alternating current measuring instrument and in that a direct current blocking capacitor is connected in series between one of said electrodes and said resistance measuring instrument.

3. Apparatus for drifting lithium in a semiconductor of the class having two opposite parallel surfaces with a negative region along one surface characterized by the presence of lithium donors while the remainder of said semiconductor is a positive region characterized by the presence of acceptor impurities, comprising, in combination, a disc-shaped electrode disposed on the surface of said positive region opposite said negative region, a ring electrode on the surface of said positive region disposed substantially concentrically around said disc electrode, a heating element for disposition against at least one of said electrodes, means for applying a reverse voltage bias between said negative region and said ring electrode, an alternating current resistance measuring instrument connected from said ring electrode to said disc-shaped electrode, a capacitance connected in series between said measuring instrument and said disc-shaped electrode, control means coupled to said instrument and providing an output signal responsive to the detection of a maximum predetermined resistance value thereby, and a switch operated by said control means and connected to cut off operation of said heating element upon receipt of said output signal from said control means whereby to terminate said drifting.

4. In lithium drifting apparatus as described in claim 3, in which said heating element is an electrical element the further combination comprising, a heater power supply connected to said element, said switch being connected in series with said power supply and said element.

5. In a process for accurately controlling the depth of the lithium drift region in a semiconductor having a positive region and a negative region, the steps comprising providing a disc-shaped electrode on the surface of said positive region and providing a ring electrode on said surface encircling said disc electrode and evenly spaced therefrom by a gap, connecting a resistance measuring instrument between said electrodes, coupling a back bias potential source across said semiconductor, simultaneously applying heat to said semiconductor, and terminating the drifting of lithium in said semiconductor when the resistance measured by said instrument exceeds a value R determined by the relationship:

$$R = \frac{\rho x}{\pi d t}$$

wherein $t$ = thickness of remaining undrifted region in centimeters
$\rho$ = resistivity of said undrifted positive region in ohm-centimeters
$x$ = distance across said gap in centimeters
$d$ = diameter of said disc in centimeters and:

$R$ = measured resistance in ohms.

No references cited.

MORRIS KAPLAN, *Primary Examiner.*